United States Patent Office 3,174,966
Patented Mar. 23, 1965

3,174,966
CYCLOSEMIACETALS OF 18-OXO-11β-HYDROXY-PREGNANES AND PROCESS FOR THEIR MANUFACTURE
Albert Wettstein, Riehen, and Karl Heusler, Basel, Switzerland, assignors to Ciba Corporation, a corporation of Delaware
No Drawing. Filed Dec. 14, 1961, Ser. No. 159,459
Claims priority, application Switzerland, Dec. 16, 1960, 14,116/60; Feb. 8, 1961, 1,474/61; June 2, 1961, 6,484/61; Oct. 11, 1961, 11,770/61; Nov. 1, 1961, 12,651/61
11 Claims. (Cl. 260—239.55)

The manufacture of cyclosemiacetals of 18-oxo-11β-hydroxy-pregnanes is of considerable importance in connection with the synthesis of aldosterone and related compounds thereof. An 18-oxo group can be introduced by oxidising an 18-hydroxyl group, or by direct synthesis (for example by splitting an 18:18a-double bond), or by reducing an 18-acid or derivative of such acid. The last-mentioned possibility has become particularly important since a variety of methods are known for the preparation of 18-acids, more especially of lactones of the 11β-hydroxy- or 20-hydroxy-18-acids of the pregnane series.

When an 18:11β-lactone was subjected to reduction with a complex metal hydride, more especially lithium aluminium hydride, it was observed that the presence of a free or esterified 21-hydroxyl group is of great importance because only when such a group is present is it possible, for example, to stop the reduction of the 18:11β-lactone of the $\Delta^5$-3:20-diethylene-dioxy-11β:21-dihydroxy-pregnene-18-acid at the cyclosemiacetal stage. Even in this case, however, the amount of reducing agent and the reduction period must be limited and the reaction temperature kept relatively low since otherwise the reduction proceeds until the 11β:18:21-trihydroxy stage is reached. On the other hand it is, however, not possible to discontinue for example, the reduction of the 18:11β-lactone of $\Delta^5$-3:20-bisethylenedioxy-11β-hydroxy-pregnene-18-acid at the semiacetal stage.

In the case of 18:11β-lactones of 20-oxo-pregnane-18-acids unsubstituted in position 21 it is relatively easy to carry the reduction with lithium aluminium hydride only to the 18-oxo stage. Starting from 20-oxo-18:11β-lactones containing a side chain in the "unnatural," α-position, the semi-acetals of 11β:20-dihydroxy-18-oxo-17-iso-pregnanes are obtained. In the case of the corresponding compounds containing a side chain in the β-position it has been observed that though the reduction extends only to the 18-oxo stage even when an excess of lithium aluminium hydride is used the 20-hydroxy-11β:18-semiacetals formed are very sensitive, and form 11β:18;18:20-bisoxido compounds with traces of acids by intramolecular acetal formation.

From the latter compound the 11β:18-cyclosemiacetal cannot be obtained in a simple manner.

The present invention is based on the surprising observation that 11β:18-cyclosemiacetals of 18-oxo-11β: 20β-dihydroxy-pregnanes can be prepared with ease and in a good yield by treating 18:20-lactones of 11-oxo-20-hydroxy-pregnane-18-acids with a complex aluminium hydride, more especially with lithium aluminium hydride.

Thus, even when an excess of reducing agent is used, the reaction according to the invention extends only to the 18-oxo stage but, instead of the 18:20-cyclosemiacetal corresponding to the 18:20-lactone, an 11β:18-cyclosemiacetal containing a free 20-hydroxyl group is formed by relactolisation. This is all the more surprising since the 20-oxo-18:11-lactones—which are isomeric with the 11-oxo-18:20-lactones used in the present process—yield under similar conditions only 11β:18;18:20-bisoxido compounds.

The reduction of the 11-oxo-18:20-lactones is carried out with complex metal hydrides suitable for reducing ketones and esters, thus more especially complex hydrides of aluminium, preferably lithium aluminium hydride, or sodium trialkoxy-aluminium hydrides and similar reducing agents. The reaction is carried out in an anhydrous medium, more especially in an ether such as diethyl ether, tetrahydrofuran, dioxane or mixtures of two or more thereof, glycol dimethyl ether, polyglycol ethers and the like. When in addition to the 11-oxo group and the 18:20-lactone group the starting material contains further oxo groups, they are likewise reduced unless they have been protected by ketalisation or enol ether formation.

Under the action of an acid, for example acetic acid, the new 18:11-cyclosemiacetals of the 11β:20-dihydroxy-18-oxo-pregnanes likewise readily yield 11β:18;18:20-bisoxido compounds.

On the other hand, when an 11β:18-cyclosemiacetal of the present invention is esterified with a reactive derivative of a carboxylic acid, for example with an anhydride or halide thereof, more especially with such a derivative of a lower aliphatic or aromatic carboxylic acid, such as acetic, propionic, trimethylacetic, trifluoroacetic, benzoic acid or with a chlorocarbonic acid ester in the presence of a base, for example pyridine, a corresponding 18:20-diester is obtained. In the diester it is easy to split the semiacetal ester group in position 18 by means of a dilute acid such, for example, as acetic, oxalic, chloracetic acid or the like, or even with water. The semiacetal group liberated in this manner can then be etherified in the known manner, for example with an anhydrous alcohol such as methanol, ethanol, propanol, isobutanol, benzyl alcohol or the like, if desired with addition of a suitable orthoformic acid ester in the presence of an acid catalyst such as a mineral acid, para-toluenesulphonic acid, or of a Lewis acid such as boron trifluoride, magnesium chloride, zinc chloride or the like. Etherification is particularly easy also with enol-ethers, for example with propenyl ether or preferably with dihydropyrane in the presence of the aforementioned acidic catalysts or small quantities of pyridine hydrochloride, phosphorus oxychloride, thionyl chloride and the like. In the resulting 11β:18-oxido-18-alkoxy-pregnanes a 20-acyloxy group present can then be subjected to alkaline hydrolysis, for example by reaction with an alkali metal hydroxide, carbonate or bicarbonate, or an alkaline earth metal hydroxide, or be converted into the hydroxyl group by reaction with lithium aluminium hydride. The 20-hydroxy-pregnane obtained in this manner can then be oxidised in the known manner to form a 20-oxo-pregnane, advantageously with the use of conditions under which the 18-ether is not split. Accordingly, it is of special advantage to oxidise with chromium trioxide-pyridine. Likewise suitable are N-halogen-acid amides or imides, for example bromacetamide or bromo-succinimide in a suitable solvent, such as tertiary butanol or a halogenated hydrocarbon, advantageously with addition of pyridine. In this manner there are obtained protected 11β:18-cyclosemiacetals of the 11β - hydroxy - 18:20 - dioxo - pregnanes mentioned above. These compounds are valuable intermediates for aldosterone and aldosterone-like compounds. In fact, the protection of the 18-hydroxy group in said 11:18-semiacetals is of particular advantage when a 21-hydroxy group has to be introduced in 21-unsubstituted compounds in order to obtain the said pharmacologically active steroids. Especially suitable are in this respect the 18-ethers, e.g. the 18-tetrahydropyranyl-ethers, e.g.

of $\Delta^4$-3:20-dioxo-11$\beta$:18-oxido-18-hydroxy-pregnene or of its $\Delta^5$-3-ethyleneketal. The introduction of the 21-hydroxy function in these compounds is performed e.g. by oxalic acid ester condensation followed by iodination, acid splitting and exchange of the 21-iodine atom of the so obtained 21-iodide for an ester group by treatment e.g. with potassium acetate. In this manner, after the protecting groups, viz. the 18-ether group or a 3-ketal group, are removed, 21-acetyl aldosterone is obtained. The 18-ethers or 18-esters of the 11$\beta$:18-cyclosemiacetals of 11$\beta$-hydroxy-18:20-dioxo-pregnane compounds obtainable according to the reactions disclosed in the present application are, however, also suitable starting compounds for the preparation of aldosterone-like compounds, such as aldosterone, its ethers, esters, 17$\alpha$-hydroxy-aldosterone, 9$\alpha$-halogen derivatives, corresponding 1-dehydro-derivatives etc., in which case these groups have to be introduced or formed in a manner known per se: Thus a 3-hydroxy group may be oxidized to the 3-oxo group without the 18-oxo group being simultaneously attacked, a double bond can easily be introduced in the so-obtained 3-oxo compounds by the usual bromination and dehydro-bromination, e.g. with tertiary bases, or dehydrogenation is carried out simultaneously in 1:2- and 4:5-position by the aid of selenium dioxide or by the action of enzymes of microbiological origin.

21-Desoxy-aldosterone and its derivatives are also pharmacologically active. For example, 21-desoxy-aldosterone-18-tetrahydropyranyl ether has an inhibitory effect on the central nervous system and influences particularly the transmission of reflexes and can be used for narcosis.

The present invention further includes the 11$\beta$:18-oxido-18:20-dihydroxy-pregnanes obtained by the present process, their 18:20-diacylates, 20-monoacylates and the 18-ethers containing in position 20 a free or esterified hydroxyl group.

In the esters the acid radicals are those of lower aliphatic monocarboxylic or dicarboxylic acids containing 1 to 8 carbon atoms, such as the radicals of acetic, propionic, butyric, trimethylacetic, succinic, glutaric, glycollic and diglycollic acid, trifluoroacetic acid, or of an aromatic carboxylic acid, preferably a monocyclic acid such as benzoic acid, of a monocyclic cycloaliphatic or araliphatic acid, such as hexahydrophthalic, tetrahydrophthalic, cyclohexane acid, cinnamic or phenylpropionic acid, or of an aliphatic or aromatic heterocyclic acid, such as furancarboxylic, nicotinic acid, or of sulfonic acids, such as methanesulfonic, benzenesulfonic, para-toluenesulfonic acid or the like. The alcohol radical in the ethers is preferably a lower aliphatic alcohol radical, such as the radical of methanol ethanol, propanol, butanol, isopropanol or isobutanol, or of an araliphatic alcohol, such as a monocyclic lower araliphatic alcohol such as benzyl alcohol, or of a heterocyclic alcohol, such as the tetrahydropyranyl residue or the like.

The present invention provides more especially 3-hydroxy- and 3-oxo-11$\beta$:18-oxido-18:20-dihydroxy-pregnanes that are saturated or unsaturated in the ring A, for example $\Delta^4$-3-oxo-11$\beta$:18-oxido-18:20-dihydroxy-pregnene, its $\Delta^5$-3-ethylene-ketal, its 18-methyl ether, 18-tetrahydropyranyl ether, its 18-acetate and the corresponding 20-acetates.

The present invention further includes 18-ethers and 18-esters of $\Delta^4$-3:20-dioxo-11$\beta$:18-oxido-18-hydroxy-pregnene and their $\Delta^5$-3-ethyleneketals and 3-enol ethers, the ester and ether residues in said compounds being those mentioned above, thus, above all $\Delta^4$-3:20-dioxo-11$\beta$:18-oxido-18-methoxy- and -18-tetrahydropyranyloxy-pregnene and its ketals and enol ethers.

As starting materials for the present process there are more especially suitable the 3-oxygenated 18:20-lactones of 11-oxo-20-hydroxy-18-acids of the pregnane and allopregnane series which may contain further substituents in the ring system and in the side-chain, particularly in one or more of the positions 1, 2, 4, 5, 6, 7, 8, 9, 12, 14, 15, 16, 17 and 21, such as esterified, or particularly etherified, hydroxyl groups, free or especially functionally converted, for example ketalized, oxo groups, alkyl groups, for example methyl groups, or halogen atoms. Esterified hydroxyl groups and free oxo groups are converted into free hydroxyl groups by the reduction according to the present process. In addition, the starting materials may contain double bonds, for example starting from carbon atom 5. The starting materials may be prepared, for example, by the process described in Experientia 16, 21 (1960). Specific starting materials are, for example, the 18:20-lactones of $\Delta^5$-3-ethylenedioxy-11-oxo-20$\beta$-hydroxy-pregnene-18-acid, 3:11-dioxo-20$\beta$-hydroxy-5$\alpha$-pregnane-18-acid, $\Delta^5$-3-ethylenedioxy-11-oxo-20$\beta$-hydroxy-19-nor-pregnene-18-acid, or the 18:20-lactone of 3:11-dioxo-20$\beta$-hydroxy-5$\beta$-pregnane-18-acid which is prepared by oxidation from the corresponding 3$\alpha$:11$\alpha$-dihydroxy compound.

The new pharmacologically active compounds can be used as medicaments, for example in the form of pharmaceutical preparations which contain the active substance in admixture with a pharmaceutical organic or inorganic, solid or liquid carrier suitable for enteral or parenteral administration. As carriers such substances come into consideration as do not react with the new compounds, such as for instance water, gelatine, lactose, starch, magnesium stearate, talc, vegetable oils, benzylalcohols, gums, polyalkylene glycols, cholesterol or other known carriers. The pharmaceutical preparations can be in the form, for instance, of tablets or dragees or in liquid form as solutions, suspensions or emulsions. They may be sterilized and/or contain auxiliary substances, such as preserving, stabilizing, wetting or emulsifying agents, salts for the modification of osmotic pressure or buffers. They may also contain other therapeutically useful substances. The preparations are obtained in the customary way. The content of active substance in these preparations, such as in an ampoule, is preferably 0.1-200 mg., or 0.03-60%.

The following examples illustrate the invention:

*Example 1*

A suspension of 500 mg. of lithium aluminium hydride in 100 cc. of absolute tetrahydrofuran is stirred for 15 minutes at room temperature, then treated with 2.0 grams of the 18:20-lactone of $\Delta^5$-3-ethylenedioxy-11-oxo-20$\beta$-hydroxy-pregnene-18-acid and the mixture is stirred for 2 hours under nitrogen at room temperature. The excess reducing agent is then decomposed by adding a solution of 7.0 grams of ammonium sulphate in 10 cc. of water and the precipitated salts are filtered off. The filter residue is rinsed with tetrahydrofuran and the filtrate is evaporated in a water-jet vacuum. The crystalline residue consists of substantially pure $\Delta^5$-3-ethylenedioxy-11$\beta$:18-oxido-18:20$\beta$-dihydroxy-pregnene. A specimen of the product, recrystallised from a mixture of methanol and methylene chloride, melts at 205 to 208° C. (after conversion and sublimation at 160° C.). Optical rotation $[\alpha]_D^{27} = -10.4°$ in chloroform. Infrared bands (in Nujol) inter alia at 3.04, 9.15, 9.25, 9.67, 9.83, 10.10, 10.26 and 10.41$\mu$.

A solution of 1.0 gram of $\Delta^5$-3-ethylenedioxy-11$\beta$:18-oxido-18:20$\beta$-dihydroxy-pregnene in 5 cc. of pyridine is mixed with 5 cc. of acetic anhydride and kept for 24 hours at room temperature. The reaction mixture is then evaporated in a water-jet vacuum, the residue is taken up in methylene chloride and the solution is washed with water. Evaporation of the dried methylene chloride solution yields 1.21 grams of an amorphous residue which, on crystallisation from ether+pentane, yields pure $\Delta^5$-3-ethylenedioxy - 11$\beta$:18 - oxido - 18:20$\beta$ - diacetoxy - pregnene which melts at 177–180° C. Optical rotation $[\alpha]_D^{20°} = +35.5°$ (c.=0.905 in chloroform). Infrared bands in methylene chloride inter alia at 5.73 and 5.77μ (acetates) and 9.10μ (ketal).

A solution of 500 mg. of the crude diacetate in 5 cc. of glacial acetic acid is heated to 100° C. under nitrogen. 5 cc. of water are then added and the mixture is kept for another 15 minutes at 100° C. and then evaporated to dryness in a water-jet vacuum. The residue is taken up in methylene chloride, and the solution is washed neutral, dried and evaporated. Crystallisation of the residue from ether yields 225 mg. of $\Delta^4$-3-oxo-11β:18-oxido-18-hydroxy-20β-acetoxy-pregnene melting at 252–255° C. (after conversion and sublimation above 180° C.). Optical rotation $[\alpha]_D^{25} = +163° \pm 1°$ in chloroform. Ultra-violet spectrum: maximum at 242 mμ ($\epsilon = 16,200$). Infrared bands in methylene chloride inter alia at 2.74, 2.88, 5.78, 5.99, 6.17, 7.27, 8.10, 9.36, 9.58, 9.80 and 10.48μ.

In an analogous manner there is obtained from the 18:20-lactone (M.P. 261–263° C.) of 3:11-dioxo-20β-hydroxy-5α-pregnane-18-acid by reaction with lithium aluminium hydride the 3β:18:20β - trihydroxy - 11β:18-oxido-5α-pregnane which yields on reaction with acetic anhydride and pyridine the 3β:18:20β-triacetoxy-11β:18-oxido-5α-pregnane. When the latter product is treated with dilute acetic acid at 100° C. as described above, it yields 3β:20β-diacetoxy-11β:18-oxido-18-hydroxy-5α-pregnane.

Example 2

A solution of 9.13 grams of $\Delta^5$-3-ethylenedioxy-11β:18-oxido-18:20β-dihydroxy-pregnene in 180 cc. of glacial acetic acid is treated with 90 cc. of water and then heated for 15 minutes at 100° C., whereupon the reaction mixture is evaporated in a water-jet vacuum. The residue is taken up in methylene chloride, the solution is washed neutral and then evaporated to dryness. Crystallisation of the residue from a mixture of methylene chloride and ether yields 6.2 grams of $\Delta^4$-3-oxo-11β:18; 18:20β-bis-oxido-pregnene melting at 203 to 206° C. Optical rotation $[\alpha]_D^{25} = +137.6 \pm 1°$. Ultraviolet spectrum: maximum at 240 mμ ($\epsilon = 16,100$). Infrared spectrum in methylene chloride: bands inter alia at 5.98, 6.17, 9.37, 9.25, 9.70, 9.95, 10.70 and 11.55μ.

Example 3

A solution of 2.37 grams of crude $\Delta^5$-3-ethylenedioxy-11β:18-oxido-18:20β-diacetoxy-pregnene in 200 cc. of glaciel acetic acid is mixed with 200 mg. of crystalline sodium acetate, and 30 cc. of water are then stirred in. After a short time crystals separate out from the resulting turbid solution but they disappear again gradually. After 2 hours the reaction mixture is poured into 200 cc. of water, extracted with methylene chloride, and the extracts are washed with dilute sodium bicarbonate solution and then with water. When the methylene chloride extracts are dried and evaporated, they yield 2.14 grams of a crude product which, on crystallisation from ether, yields 1.39 grams of $\Delta^5$-3-ethylenedioxy-11β:18-oxido-18-hydroxy-20β-acetoxy-pregnene; after another crystallisation from acetone+hexane it melts at 210–212° C. Optical rotation $[\alpha]_D = +5.6°$ in chloroform. Infra-red bands in methylene chloride inter alia at 2.78, 2.92, 5.78, 7.30, 8.10, 9.10, 9.25, 9.79, 10.10 and 10.50μ.

0.1 cc. of acetylchloride is stirred into a solution of 0.23 cc. of pyridine and 0.2 cc. of absolute methanol in 10 cc. of anhydrous benzene. After 20 minutes, 765 mg. of $\Delta^5$ - 3 - ethylenedioxy-11β:18-oxido-18-hydroxy-20β-acetoxy-pregnene and 12.5 cc. of dihydropyran are added and the whole is kept for 5 days at room temperature, then diluted with benzene, washed with sodium bicarbonate solution and with water, and the aqueous solutions are once more extracted with benzene. The benzene solutions are combined and dried, evaporated in a water-jet vacuum and the high-boiling condensation products are removed under a pressure of 0.05 mm. Hg; the residue so obtained contains $\Delta^5$-3-ethylenedioxy-11β:18-oxido-18-tetrahydropyranyloxy-20β-acetoxypregnene. By chromatography on 30 grams of alumina there are obtained from the first fractions eluted with a mixture of benzene and hexane (1:1) 171 mg. of the pure compound melting at 225–228° C.; $[\alpha]_D^{25} = +63.8°$ (c.=1.093 in chloroform); Infrared bands (methylene chloride solution) inter alia at 5.78μ (acetate), 7.28, 8.92, 9.02, 9.10, 9.37, 9.85, 10.10, 10.55, 11.07 and 12.38μ. From the fractions eluted with a mixture of benzene and ethyl acetate (4:1) and with ethyl acetate another 300 mg. of pure $\Delta^5$ - 3-ethylenedioxy-11β:18-oxido-18-hydroxy-20β-acetoxy-pregnene can be recovered.

27 mg. of $\Delta^5$-3-ethylenedioxy-11β:18-oxido-18-tetrahydropyranyloxy-20β-acetoxy-pregnene are dissolved in 5 cc. of absolute tetrahydrofuran and added to a solution of 100 mg. of lithium aluminium hydride in 5 cc. of tetrahydrofuran. The reaction mixture is stirred for 30 minutes at room temperature and then treated with 0.8 cc. of saturated ammonium sulphate solution. Any undissolved salt is then separated and the filter residue washed with tetrahydrofuran. The crystalline residue of the filtrate evaporated at a water-jet vacuum (24 mg.) consists of pure $\Delta^5$-3-ethylene-dioxy-11β:18-oxido-18-tetrahydropyranyloxy-20β-hydroxy-pregnene which melts at 212–214° C. after recrystallization from ether. In the infrared spectrum (methylene chloride solution) the compound shows, inter alia, bands at 2.82, 8.85, 8.98, 9.08, 9.26, 9.93, 10.44, 10.57, 11.06 and 11.51μ.

72 mg. of this compound are stirred in 3 cc. of pyridine with 100 mg. of chromium trioxide for 18 hours at 55° C. The reaction mixture is poured into 20 cc. of sodium sulphite solution of 5% strength and then extracted several times with benzene.

The benzene extracts are washed with water, dried and evaporated at a water-jet vacuum to yield 65 mg. of an oily residue which contains $\Delta^5$-3-ethylenedioxy-11β:18-oxido-18-tetrahydropyranyloxy-20-oxo - pregnene. After purification as described in Example 8 this compound melts at 190–193° C.

Example 4

A solution of 200 mg. of $\Delta^5$-3-ethylenedioxy-11β:18-oxido-18-hydroxy-20β-acetoxy-pregnene in a mixture of 5 cc. of absolute dioxane, 1 cc. of orthoformic acid methyl ester and 0.05 cc. of absolute methanol is treated with a mixture of 0.01 cc. of concentrated sulphuric acid and 0.25 cc. of dioxane and then stirred for 20 minutes at room temperature. 0.5 cc. of pyridine is then added, the whole is diluted with benzene and the solution is washed with dilute sodium bicarbonate solution and with water. Evaporation of the benzene solution yields 237 mg. of crude $\Delta^{3,5}$-3-methoxy-11β:18-oxido-18-methoxy-20β-acetoxy-pregnadiene. By crystallization from methanol the pure compound melting at 164–167° C. is obtained which, dissolved in methylene chloride, shows, inter alia, bands in the infrared spectrum at 5.79μ (acetate); 6.05, 6.15, 6.90, 7.27, 8.13, 8.55, 9.09, 9.33, 9.65, 9.83, 10.10 and 11.47μ.

Example 5

8.36 grams of crude $\Delta^5$-3-ethylenedioxy-11β:18-oxido-18:20β-diacetoxy-pregnene are heated in 80 cc. of glacial acetic acid at 100° C., treated with 80 cc. of water and then maintained for another 15 minutes at 100° C. The reaction mixture is then evaporated at a water-jet vacuum, the residue taken up in methylene chloride and the solution washed with sodium bicarbonate solution and with water. From the evaporation residue of the dried methylene chloride solution (7.55 grams) there is obtained by recrystallization from a mixture of methylene chloride and ether 4.88 grams of $\Delta^4$-3-oxo-11β:18-oxido-18-hydroxy-20β-acetoxy-pregnene melting at 252–255° C. described in Example 1.

The mother liquor is evaporated to dryness and the residue chromatographed on 130 grams of alumina. From the fractions eluted with benzene there are obtained about 250 mg. of $\Delta^4$-3-oxo-11$\beta$:18; 18-20$\beta$-bisoxido-pregnene melting at 203–206° C. described in Example 2. With a mixture of benzene and ethyl acetate (9:1) only oily products are eluted, whereas with a mixture of benzene and ethyl acetate (4:1) a crude product is obtained from which, by crystallization from ether, 414 mg. of $\Delta^4$-3-oxo-11$\beta$-hydroxy-18:20$\beta$-diacetoxy-pregnene melting at 195–197° C. are obtained; $[\alpha]_D^{25} = +164°$ (c.=1.029 in chloroform); ultraviolet maximum at 242 m$\mu$ ($\epsilon$=16,650); infrared bands inter alia at 2.74, 2.82, 5.77, 5.99, 6.17 and 8.13$\mu$.

With ethyl acetate there are finally eluted about 400 mg. of the above described $\Delta^4$-3-oxo-11$\beta$:18-oxido-18-hydroxy-20$\beta$-acetoxy-pregnene melting at 252–255° C.

140 mg. of this compound are dissolved in 3 cc. of acetone and treated at 0° C. with 0.2 cc. of an aqueous solution containing in 5.00 cc. 1.326 grams of chromium trioxide and 1.15 cc. of concentrated sulphuric acid. The reaction mixture is then stirred for 10 minutes at 0° C., poured into a sodium acetate solution and extracted with methylene chloride. The extract is washed with water, dried, evaporated and crystallized from a mixture of methylene chloride and ether to yield the 18:11-lactone of $\Delta^4$-3-oxo-11$\beta$-hydroxy-20$\beta$-acetoxy-pregnene-18-acid melting at 272–275° C.; $[\alpha]_D^{26} = +157°$ (c.=1.001 in chloroform); ultraviolet maximum at 238 m$\mu$ ($\epsilon$=17,700). In methylene chloride solution the compound shows in the infrared spectrum inter alia bands at 5.64$\mu$ ($\gamma$-lactone); 5.76 and 8.10$\mu$ (acetate); 5.96 and 6.15$\mu$ ($\Delta^4$-3-ketone).

By hydrolysing the compound with 0.5 N-sodium hydroxide solution in methanol for 15 hours at 60° C. the 18:11-lactone of $\Delta^4$-3-oxo-11$\beta$:20$\beta$-dihydroxy-pregnene-18-acid melting at 181–185° C. is obtained; $[\alpha]_D^{26} = +149°$ (c.=0.990 in chloroform); ultraviolet maximum at 238 m$\mu$ ($\epsilon$=16,800); in the infrared spectrum inter alia bands at 2.73 and 2.82$\mu$ (OH); 5.64$\mu$ ($\gamma$-lactone); 5.97 and 6.16$\mu$ ($\Delta^4$-3-ketone).

On being oxidized with chromic acid-sulphuric acid in acetone as described above, the compound yields the known 18:11-lactone of $\Delta^4$-3:20-dioxo-11$\beta$-hydroxy-pregnene-18-acid melting at 194–196° C.

*Example 6*

4.90 grams of $\Delta^4$-3-oxo-11$\beta$:18-oxido-18-hydroxy-20$\beta$-acetoxy-pregnene are suspended in a mixture of 15 cc. of tetrahydrofuran and 15 cc. of dihydropyrane and, after the addition of 0.06 cc. of phosphorus oxychloride, stirred for 90 minutes at room temperature. The reaction mixture is then poured into 100 cc. of dilute sodium bicarbonate solution, extracted with methylene chloride, the extracts washed with water and the dried methylene chloride solutions evaporated. The residue (7.03 grams) is dissolved in hexane and filtered through 100 grams of alumina. With hexane there are first eluted oily condensation products of dihydropyrane, with the subsequent hexane and benzene fractions the bulk of the end product is eluted. By crystallizing the residues of these eluates from a mixture of ether and pentane there are obtained 3.66 grams of pure $\Delta^4$-3-oxo-11$\beta$:18-oxido-18-tetrahydropyranyloxy-20$\beta$-acetoxy-pregnene melting at 182–184° C.; $[\alpha]_D^{26} = +232°$ (c.=0.709 in chloroform); ultraviolet maximum at 241 m$\mu$ ($\epsilon$=17,000); in the infrared spectrum (in methylene chloride solution) inter alia bands at 5.78$\mu$ (acetate); 5.99 and 6.18$\mu$ ($\Delta^4$-3-ketone), 8.12, 8.92, 9.35, 9.84, 10.04, 10.51, 11.05, and 11.55$\mu$.

3.66 grams of the compound are heated at the boil in 200 cc. of methanol with a solution of 1.84 grams of potassium hydroxide in 8 cc. of water for 40 hours under nitrogen. After cooling, the solution is saturated with carbon dioxide, diluted with methylene chloride, washed several times with water and the aqueous solutions extracted with methylene chloride. The extracts are dried, evaporated and crystallized from ether to yield 3.09 grams of $\Delta^4$-3-oxo-11$\beta$:18-oxido-18-tetrahydropyranyloxy-20$\beta$-hydroxy-pregnene melting at 176–179° C.; $[\alpha]_D^{25} = +208°$ (c.=1.007 in chloroform); ultraviolet maximum at 241 m$\mu$ ($\epsilon$=17,300); infrared bands (methylene chloride solution) inter alia at 2.81$\mu$ (hydroxyl); 5.99 and 6.19$\mu$ ($\Delta^4$-3-ketone); 8.95, 9.88, 10.05, 10.52, 11.05 and 11.55$\mu$.

To 50 cc. of cold absolute pyridine there is added, with stirring, 1.00 gram of chromium trioxide and then 1.00 gram of $\Delta^4$-3-oxo-11$\beta$:18-oxido-18-tetrahydropyranyloxy-20$\beta$-hydroxy-pregnene and the reaction mixture is stirred with the exclusion of moisture for 15 hours at 55–60° C. bath temperature. The reaction mixture is cooled, then poured into 500 cc. of sodium sulphite solution of 5% strength and shaken with 300 cc. of benzene. After filtering off the undissolved portions, the benzene solution is separated, washed several times with water and the aqueous extracts extracted again with benzene. From the dried benzene extracts there are obtained, after evaporation at a water-jet vacuum, 1.02 grams of a residue which is purified by filtration through 30 grams of silica gel. From the evaporation residues of the fractions eluted with a mixture of benzene and ethyl acetate (9:1) there are obtained by crystallization from ether 397 mg. of pure $\Delta^4$-3:20-dioxo-11$\beta$:-18-oxido-18-tetrahydropyranyloxy-pregnene melting at 191–193° C.; $[\alpha]_D^{26} = +305.5°$ (c.=0.994 in chloroform); ultraviolet maximum at 241 m$\mu$ ($\epsilon$=17,150); in the infrared spectrum (methylene chloride solution) inter alia bands at 5.86$\mu$ (20-ketone); 5.99 and 6.19$\mu$ ($\Delta^4$-3-ketone).

From the subsequent fractions eluted with mixtures of benzene and ethyl acetate (9:1) and (1:1) there are obtained 310 mg. of a crystallisate which contains, in addition to the above 20-ketone, small quantities of the 20-hydroxy compound. By repeating the oxidation with chromic acid and pyridine there is easily obtained from the above mixture the pure $\Delta^4$-3:20-dioxo-11$\beta$:18-oxido-18-tetrahydropyranyloxy-pregene.

10 cc. of aqueous acetic acid of 70% strength are heated to 100° C. and 100 mg. of the above tetrahydropyranyl ether are added. The reaction mixture is stirred for 5 minutes at 100° C., poured into 50 cc. of ice-water and extracted with methylene chloride. The extracts are washed neutral with dilute sodium bicarbonate solution, dried and evaporated. From the residue there is obtained by crystallization from ether pure $\Delta^4$-3:20-dioxo-11$\beta$:18-oxido-18-hydroxy-pregnene (21-desoxy-aldosterone) melting at 166–168° C.; $[\alpha]_D^{26} = +19.8°$ (c.=0.785 in chloroform); ultraviolet maximum at 240 m$\mu$ ($\epsilon$=16,900). The compound displays in the infrared spectrum (in methylene chloride solution) inter alia bands at 2.75 and 2.93$\mu$ (hydroxyl); 5.86$\mu$ (20-ketone); 5.98 and 6.18$\mu$ ($\Delta^4$-3-ketone); 7.47, 8.12, 8.39, 9.58, 10.00, 10.46, 10.76 and 11.54$\mu$.

41 mg. of the compound are dissolved in 4.0 cc. of pyridine and treated with 50 mg. of chromium trioxide. The mixture is stirred for 2 hours at room temperature, then poured into a sodium sulphite solution of 5% strength and the reaction product extracted with benzene. From the extracts washed with water and dried an evaporation residue is obtained from which there is isolated by crystallisation from a mixture of acetone and ether the known 18:11-lactone of $\Delta^4$-3:20-dioxo-11$\beta$-hydroxy-pregnene-18-acid melting at 194–196° C.

*Example 7*

250 mg. of $\Delta^4$-3-oxo-11$\beta$:18-oxido-18-tetrahydropyranyloxy-20$\beta$-hydroxy-pregnene are dissolved in 7.5 cc. of acetone and, after cooling to −10° C., treated with stirring with 0.2 cc. of an aqueous solution containing in 5.00 cc. 1.326 grams of chromium trioxide and 1.15 cc. of concentrated sulphuric acid. The reaction mixture is stirred for 30 minutes at 10° C., a solution of 4.4 grams of crystalline sodium acetate in 6.4 cc. of water is added, and extraction is carried out with benzene. The extracts are washed with water, dried and evaporated at a water-jet vacuum to yield 239 mg. of crude product from which by direct crystallization from ether 74 mg. of $\Delta^4$-3:20-dioxo - 11$\beta$:18 - oxido - 18 -tetrahydropyranyloxy-pregnene melting at 191–193° C. are isolated. The mother liquor contains, in addition to further quantities of the compound, a considerable amount of starting material.

*Example 8*

2.0 grams of $\Delta^5$-3-ethylenedioxy-11$\beta$:18-oxido-18-hydroxy-20$\beta$-acetoxy-pregene are dissolved in 6.0 cc. of absolute tetrahydrofuran and, after the addition of 6.0 cc. of dihydropyrane and 0.02 cc. of phosphorus oxychloride, stirred for one hour at room temperature with the exclusion of moisture. The mixture is then poured into dilute sodium bicarbonate solution and the product extracted with methylene chloride. The extracts are washed with water, dried and evaporated to yield 3.105 grams of a crystalline residue. From the latter there are obtained by crystallization from ether 1.30 grams of the $\Delta^5$ - 3 - ethylenedioxy -11$\beta$:18 - oxido - 18 - tetrahydropyranyloxy-20$\beta$-acetoxy-pregnene melting at 225–228° C. described in Example 3; $[\alpha]_D = +64°$ (in chloroform). The evaporation residue is chromatographed on 14 grams of alumina and from the fractions eluted with hexane and a mixture of hexane and benzene (1:1) there is isolated by crystallization from a mixture of ether and pentane a compound which is isomeric to the above compound and which melts at 148–150° C.; $[\alpha]_D^{27} = -6.7°$ (in chloroform); infrared bands (methylene chloride solution) inter alia at 5.76, 7.27, 8.08, 8.92, 9.01, 9.59, 9.83, 10.27, 10.99, 11.30 and 11.49$\mu$.

After heating 5.47 mg. of the above compound in 1 cc. of acetic acid of 70% strength for 15 minutes at 100° C., the cooled reaction mixture is extracted with methylene chloride and a solution obtained which, on being evaporated, yields 3 mg. of $\Delta^4$-3-oxo-11$\beta$:18-oxido-18-hydroxy-20$\beta$-acetoxy-pregnene melting at 210–212° C.

After treating 1.29 grams of the isomer melting at 225–228° C. with 500 mg. of lithium-aluminium hydride in 150 cc. of absolute tetrahydrofuran as described in Example 3 there are obtained 1.28 grams of a crude product from which by recrystallization from ether there are obtained 965 mg. of pure $\Delta^5$-3-ethylenedioxy-11$\beta$:18-oxido-18-tetrahydropyranyloxy-20$\beta$-hydroxy-pregnene melting at 212–214° C.; $[\alpha]_D = +81°$ (in chloroform).

To a mixture of 1.0 gram of chromium trioxide and 20 cc. of pyridine there is added 1.0 gram of crude $\Delta^5$-3-ethylenedioxy-11$\beta$:18-oxido-18-tetrahydro-pyranyloxy-20 - hydroxy-pregnene, and the reaction mixture is stirred for 16 hours at 55° C. After cooling, the reaction mixture is poured on to 250 cc. of sodium sulphite solution of 5% strength, shaken with benzene, filtered, and the separated aqueous layer extracted again with benzene. The benzene extracts are washed with water, dried and evaporated at a water-jet vacuum. The residue (983 mg.) is dissolved in benzene and chromatographed on 20 grams of silica gel (containing 15% of water). By recrystallization from ether of the fractions eluted with a mixture of benzene and ethyl acetate (9:1) there are obtained 426 mg. of $\Delta^5$-3-ethylenedioxy-11$\beta$:18-oxido - 18 - tetrahydropyranyloxy-20-oxo-pregnene melting at 190–193° C.;

$$[\alpha]_D^{27} = +139.5°$$

(c.=1.070 in chloroform); infrared bands (in methylene chloride solution) inter alia at 5.86, 7.37, 8.30, 8.94, 9.02, 9.84, 10.54, 11.01 and 11.50$\mu$.

From the fractions eluted with mixtures of benzene and ethyl acetate (4:1) and (1:1) there are obtained by recrystallizing the evaporation residues from ether 69 mg. of $\Delta^5$-3-ethylenedioxy-7:20-dioxo-11$\beta$:18-oxido-18 - tetrahydropyranyloxy-pregnene which melts at 238–240° C.; $[\alpha]_D = +85°$ (in chloroform); which on being treated with aqueous acetic acid at 100° C. yields $\Delta^{3,5}$-3:18-dihydroxy-7:20-dioxo-11$\beta$:18-oxido-pregnadiene melting at 203–207° C. Ultraviolet maxima at 320 m$\mu$ ($\epsilon$=22,000) and at 392 m$\mu$ (1600).

To a mixture of 23 cc. of glacial acetic acid and 7 cc. of water heated to 100° C. there are added 323 mg. of crystalline $\Delta^5$-3-ethylenedioxy-11$\beta$:18-oxido - 18 - tetrahydropyranyloxy-20-oxo-pregnene, and the mixture is kept for another 10 minutes at 100° C. The reaction mixture is then poured into 100 cc. of ice-water and extracted several times with methylene chloride. The extracts are washed neutral with sodium bicarbonate solution, dried and evaporated to yield 243 mg. of residue. The latter is crystallized from ether to yield 139 mg. of the $\Delta^4$-3:20-dioxo-11$\beta$:18-oxido-18-hydroxy-pregnene melting at 166–168° C. described in Example 6.

By acetylation of 95 mg. of the above compound in 2 cc. of pyridine and 2 cc. of acetic anhydride for 22 hours at room temperature there are obtained 97 mg. of crude product which is $\Delta^4$-3:20-dioxo-11$\beta$:18-oxido-18-acetoxy-pregnene.

*Example 9*

1.55 grams of the $\Delta^4$-3-oxo-11$\beta$:18-oxido-18-hydroxy-20$\beta$-acetoxy-pregnene described in Example 1 are dissolved in 150 cc. of dioxane and, after the addition of 1.5 grams of potassium carbonate in 100 cc. of water, allowed to stand for 45 hours at room temperature. The reaction mixture is then diluted with methylene chloride and water and the aqueous phase extracted again with methylene chloride. The combined extracts are dried and evaporated to dryness at a water-jet vacuum. From the residue (1.64 grams) there are obtained by recrystallization from a mixture of methylene chloride and ether 1.16 grams of $\Delta^4$-3-oxo-11$\beta$:18-oxido-18:20$\beta$-dihydroxy-pregnene melting at 196–199° C.; $[\alpha]_D = +136°$ (c.=0.982 in chloroform); ultraviolet maximum at 241 m$\mu$ ($\epsilon$=17,100); infrared bands (methylene chloride solution) inter alia at 2.75, 5.98, 6.18, 7.50, 8.12, 9.15, 9.63, 9.82, 10.01, 10.44, 10.57 and 11.55$\mu$.

*Example 10*

2.0 grams of the 18:11-lactone of $\Delta^5$-3-ethylenedioxy-11$\beta$:20$\beta$-dihydroxy-pregnene-18-acid are reduced in 100 cc. of tetrahydrofuran with 500 mg. of lithium-aluminium hydride as described in Example 1. After 2 hours' reaction time the reaction mixture is worked up by the addition of saturated ammonium sulphate solution. By crystallization of the crude product from a mixture of methylene chloride and methanol there are obtained 1.43 grams of pure $\Delta^5$-3-ethylenedioxy-11$\beta$:18-oxido-18:20$\beta$-dihydroxy-pregnene melting at 205–208° C.

*Example 11*

2.0 grams of the 18:11-lactone of $\Delta^5$-3-ethylenedioxy-11$\beta$-hydroxy-20-oxo-pregnene-18-acid are reduced as described in Example 1 with lithium-aluminium hydride. By recrystallization of the crude product from a mixture of methylene chloride and methanol there are obtained 1.47 grams of crystals melting at 184–190° C. which, in addition to a small amount of 20$\beta$-hydroxy compound, contain as main product $\Delta^5$-3-ethylenedioxy-11$\beta$:18-oxido-18:20$\alpha$-dihydroxy-pregnene; $[\alpha]_D = +13°$ (in chloroform).

1.0 gram of the crude mixture obtained after reduction with lithium-aluminium hydride is acetylated with pyridine and acetic anhydride as described in Example 1. By crystallization from ether the pure $\Delta^5$-3-ethylenedioxy-11$\beta$:18-oxido-18:20$\alpha$-diacetoxy - pregnene melting at 154–157° C. is isolated; $[\alpha]_D = +40°$ (in chloroform).

400 mg. of $\Delta^5$-3-ethylenedioxy-11$\beta$:18-oxido-18:20$\alpha$-dihydroxy-pregnene melting at 184–190° C. are heated with dilute acetic acid as described in Example 2. By crystallisation of the crude product from a mixture of methylene chloride and ether there is obtained $\Delta^4$-3-oxo-11$\beta$:18;18:20$\alpha$-bisoxido-pregnene melting at 203–205° C.; $[\alpha]_D = +158°$ (in chloroform).

Example 12

453 mg. of $\Delta^4$-3:20-dioxo-11$\beta$:18-oxido-18-hydroxy-pregnene are dissolved in 2.5 cc. of absolute tetrahydrofuran and 2.5 cc. of freshly distilled dihydropyrane and, after the addition of 0.01 cc. of phosphorus oxychloride, allowed to stand for 4 hours at +10° C. with the exclusion of moisture. The reaction mixture is then poured into 30 cc. of dilute sodium bicarbonate solution and extracted twice with methylene chloride. The extracts are washed with water, dried and evaporated. The crude product, 620 mg., is dissolved in benzene and filtered through 15 grams of silica gel containing water. At first, oily byproducts are eluted with benzene. With mixtures of benzene and ethyl acetate (19:1) and (9:1) 395 mg. of crude $\Delta^4$-3:20-dioxo-11$\beta$:18-oxido-18-tetrahydropyranyloxy-pregnene are eluted which, after crystallization from ether, melts at 191–193° C.

What is claimed is:

1. $\Delta^5$ - 3 - ethylenedioxy - 11$\beta$:18 - oxido - 18:20 - diacetoxy-pregnene.
2. $\Delta^4$ - 3 - oxo - 11$\beta$:18 - oxido - 18 - hydroxy - 20 - acetoxy-pregnene.
3. $\Delta^5$ - 3 - ethylenedioxy - 11$\beta$:18 - oxido - 18 - hydroxy-20-acetoxy-pregnene.
4. $\Delta^5$ - 3 - ethylenedioxy - 11$\beta$:18 - oxido - 18 - tetrahydropyranyloxy-20-acetoxy-pregnene.
5. $\Delta^4$ - 3 - oxo - 11$\beta$:18 oxido - 18 - tetrahydropyranyloxy-20-acetoxy-pregnene.
6. $\Delta^4$ - 3 - oxo - 11$\beta$:18 - oxido - 18 - tetrahydropyranyloxy-20-hydroxy-pregnene.
7. $\Delta^5$ - 3 - ethylenedioxy - 11$\beta$:18 - oxido - 18 - tetrahydropyranyloxy-20-hydroxy-pregnene.
8. Process for the manufacture of 11$\beta$:18-oxido-18:20-dihydroxy-compounds of the pregnane series, wherein a 18:20-lactone of an 11-oxo-20-hydroxy-pregnane-18-acid is treated with a complex aluminum hydride selected from the group consisting of lithium aluminum hydride and a sodium tri-lower alkoxy aluminum hydride.
9. Process according to claim 8, wherein the resulting product is treated with an acylating agent selected from the group consisting of a lower aliphatic carboxylic acid anhydride, a lower aliphatic carboxylic acid halide, a monocyclic carbocyclic aromatic carboxylic acid halide, the 18:20-diacylate formed is hydrolyzed under acidic conditions, in the resulting 11$\beta$:18-oxido-18-hydroxy-20-monoacylate the 18-hydroxy group is etherified with a member selected from the group consisting of a lower alkanol, a lower aliphatic enol ether, a monocyclic carbocyclic aryl-lower alkanol and dihydropyrane, the 18-ether formed is hydrolyzed under alkaline conditions, and the resulting 20-hydroxy compound is oxidized in 20-position by a member selected from the group consisting of chromium trioxide, a lower N-halogeno-carboxylic acid amide and a lower N-halogeno carboxylic acid imide.
10. Process according to claim 9, wherein the resulting 18-ether of the 11$\beta$:18-oxido-18-hydroxy-20-oxo-compound of the pregnane series, is hydrolyzed under acidic conditions to obtain the free 18-hydroxy-11$\beta$:18-oxido-20-oxo-compounds.
11. A member selected from the group consisting of a compound of the formula

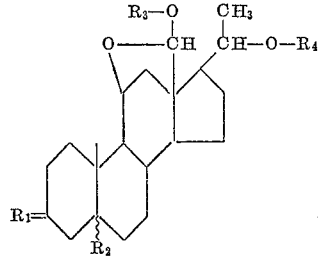

in which $R_1$ is a member selected from the group consisting of oxo, lower alkylenedioxy, hydrogen and hydroxy, hydrogen and acyloxy and hydrogen and lower alkoxy, $R_2$ is a member selected from the group consisting of an $\alpha$-positioned hydrogen and a $\beta$-positioned hydrogen, $R_3$ is a member selected from the group consisting of hydrogen, acyl, lower alkyl and 2-tetrahydropyranyl, and $R_4$ is a member selected from the group consisting of hydrogen and acyl, the 4-dehydro derivatives of the 3-oxo-compounds, the 5-dehydro derivatives of a member selected from the group consisting of the 3-lower alkylene ketals and lower alkyl enol ethers and the 3,5-bis-dehydro derivatives of the 3-lower alkoxy compounds, said acyloxy and acyl radicals being derived from acids selected from the group consisting of carboxylic acids and sulfonic acids containing up to 8 carbon atoms.

References Cited in the file of this patent

UNITED STATES PATENTS

| | | |
|---|---|---|
| 2,844,513 | Wettstein et al. | July 22, 1958 |
| 2,904,545 | Reichstein et al. | Sept. 15, 1959 |
| 2,973,357 | Johnson et al. | Feb. 28, 1961 |
| 2,994,694 | Wettstein et al. | Aug. 1, 1961 |
| 3,092,626 | Wettstein et al. | June 4, 1963 |

OTHER REFERENCES

Beal et al.: Chem. and Ind., Dec. 3, 1960, pp. 1505–1506.